May 5, 1970 D. J. MALIK 3,509,996
DEFECTIVE PACKAGE DETECTOR
Filed Nov. 24, 1967 2 Sheets-Sheet 1
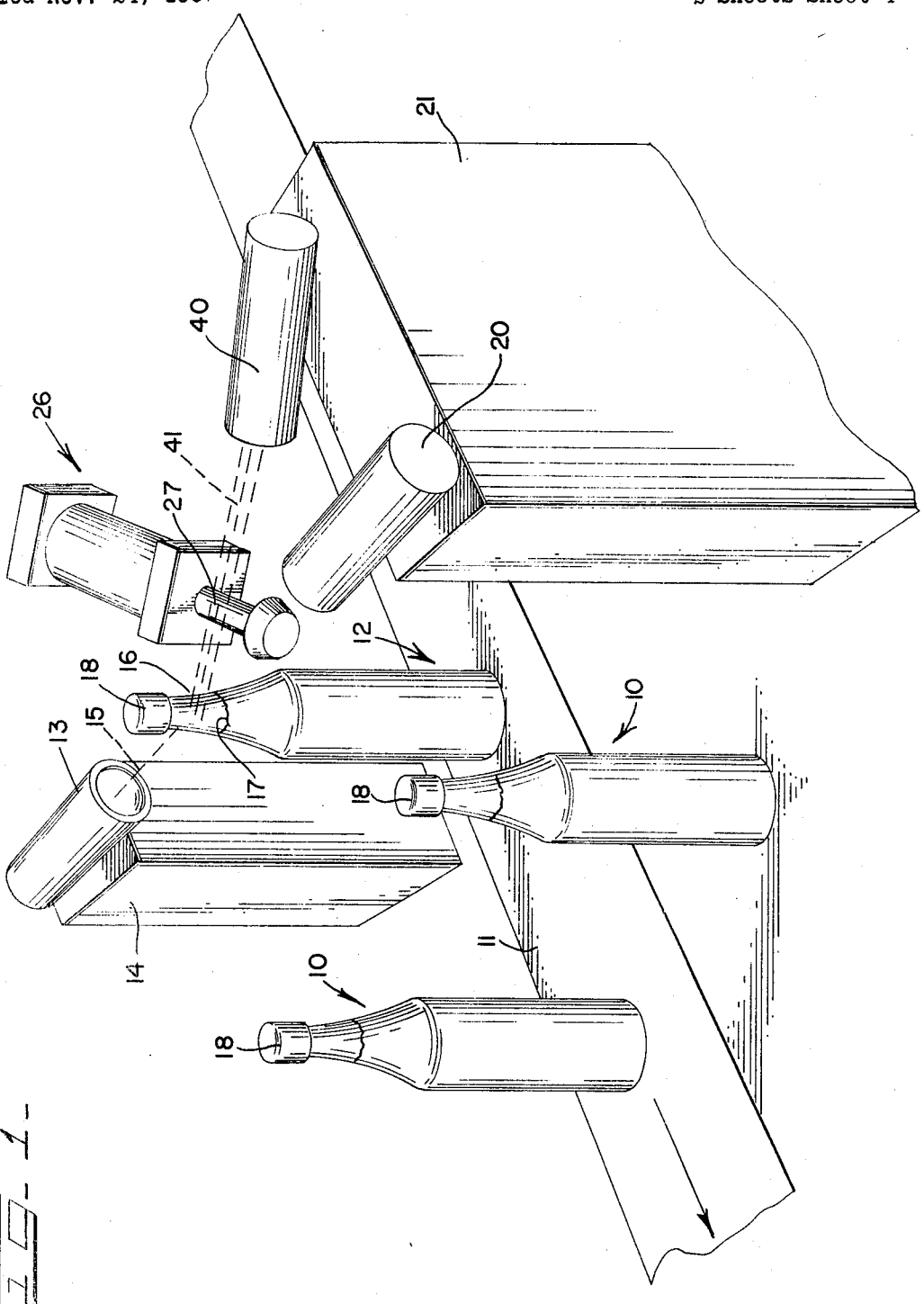
INVENTOR
DONALD J. MALIK
BY
ATT'YS.

May 5, 1970

D. J. MALIK 3,509,996

DEFECTIVE PACKAGE DETECTOR

Filed Nov. 24, 1967

INVENTOR
DONALD J. MALIK
BY
ATT'YS.

United States Patent Office 3,509,996
Patented May 5, 1970

3,509,996
DEFECTIVE PACKAGE DETECTOR
Donald J. Malik, Franklin Park, Ill., assignor to Continental Can Company, Inc., New York, N.Y., a corporation of New York
Filed Nov. 24, 1967, Ser. No. 685,624
Int. Cl. B07c 5/342
U.S. Cl. 209—111.7      7 Claims

ABSTRACT OF THE DISCLOSURE

A method and apparatus for use with a conveyor at inspection and rejection stations for inspecting the condition of the headspace in filled and capped product containers of glass or other transparent material, which headspace, in a properly filled container, is devoid of any product or other substance so that a beam of light will pass freely through the same, the apparatus comprising a light source which is arranged to direct a beam of light across the conveyor at an inspection station to activate a photocell disposed in alignment therewith on the opposite side of the conveyor, the light beam being at an elevation so as to pass through the headspace above the product of a properly filled container at the inspection station, the passage of the light beam being interrupted if the container is overfilled, resulting in the activation by the photocell, through an amplifier and relay circuit, of a device for ejecting the container from the line, and a second photocell disposed on the side of the conveyor opposite the light source and at an angle to the normal path of the light beam so as to intercept the light beam when it is refracted due to the presence in the headspace of water or other material which will cause refraction of the light beam.

---

This invention relates to package inspection and is more particularly concerned with an improved system for sensing defective packages in a packaging employing glass bottles or jars which are normally filled with a product to a level which leaves a space above the top of the product which space is empty in a properly filled package.

In the packaging of certain products, for example catsup, glass bottles, jars or like containers are filled with the product to a predetermined level which means the top of the product is normally spaced below the cap or other closure. This space, which is commonly referred to as "headspace" and which extends some distance below the bottom face of the closure cap, in a properly filled container, is empty and light will pass through the same without interference. However, a container may be overfilled with the product due to improper adjustment or timing of the filling apparatus or due to faulty capping water may enter and fill the headspace or mix with the product therein when the filled container is processed. It is desirable to detect and remove from the processing line any package which is defective, that is, any package which lacks an empty headspace and it is an object of the invention to provide an inspection method and apparatus for sensing those packages which do not have the desired empty headspace and for ejecting such packages, which are frequently referred to as "duds," from the conveyor or other package supporting means.

It is a more specific object of the invention to provide a system for inspecting product filled glass bottles or jars and for ejecting from a processing line any so-called "duds" which do not have an empty headspace, wherein a light beam is directed through the headspace area at an inspection station for activating a photocell which controls, through an amplifier and relay circuit, a device for ejecting any container in which the normal headspace is occupied by the product as a result of overfilling, or by a light refracting substance as a result of improper processing or closure applying operations.

It is a further object of the invention to provide a system for inspecting product filled glass containers, so as to identify for elimination from the packaging line packages which do not have an empty headspace due to over-filling of the product or other imperfect filling, closing and processing operations wherein a light beam is directed across a conveyor on which the packages are advancing so as to normally actuate an aligned photocell on the opposite side of the conveyor, the photocell being connected through an amplifier and relay circuit with a device for ejecting containers from the line which ejecting device is actuated upon interruption of the passage of the light beam and wherein a second photocell is disposed so as to be actuated by the light beam when refraction thereof occurs due to the presence of a substance in the headspace area which will refract the light beam.

Another object of the invention is to provide a method of detecting the presence in the headspace of a product filled bottle, jar or other glass container, of water or diluted product, wherein a light beam is focused on the neck of the bottle or glass container above the product level and a light sensing device is positioned on the opposite side of the container so as to be activated when the light beam is changed in direction, shape or intensity as a result of the presence of water, diluted product or other light refracting substance in the headspace area and which actuates a signal or otherwise indicates the presence of a defective package.

These and other objects and advantages of the invention will be apparent from a consideration of the method and apparatus which is illustrated in the accompanying drawings wherein:

FIG. 1 is a perspective view, largely schematic, of an inspection and ejecting apparatus which embodies the principal features of the invention;

Figure 2:
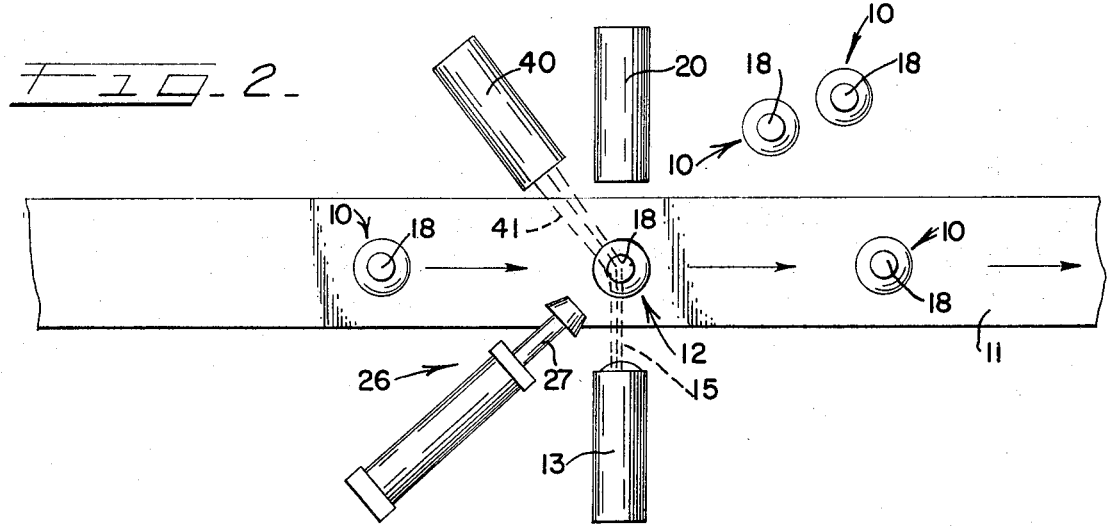
FIG. 2 is a schematic plan view illustrating the principle involved in the operation of the apparatus of FIG. 1.

Referring to FIGS. 1 and 2 of the drawings, there is illustrated an arrangement or system for inspecting packages in a bottling line in which glass bottles are being filled with a fluid product such as, for example, catsup. In this type of processing operation, catsup bottles are filled with the product to a predetermined level, with the top of the product spaced an appreciable distance below the bottom of the cap which closes the mouth of the bottle so that normally there is an empty space provided in the neck of the bottle between the uppermost level of the product and the cap. In a subsequent operation following the capping of the bottles they are passed through a water bath and an improperly capped bottle which lacks a proper seal may allow water to enter the headspace and fill the same or mix with the product, resulting in an imperfect package which must be removed from the line to avoid customer objections and complaints. Also, during the filling defective operation of the filling apparatus may result in an overfill so as to eliminate the normal headspace and it is desirable to remove any packages in which this occurs.

Figure 3:
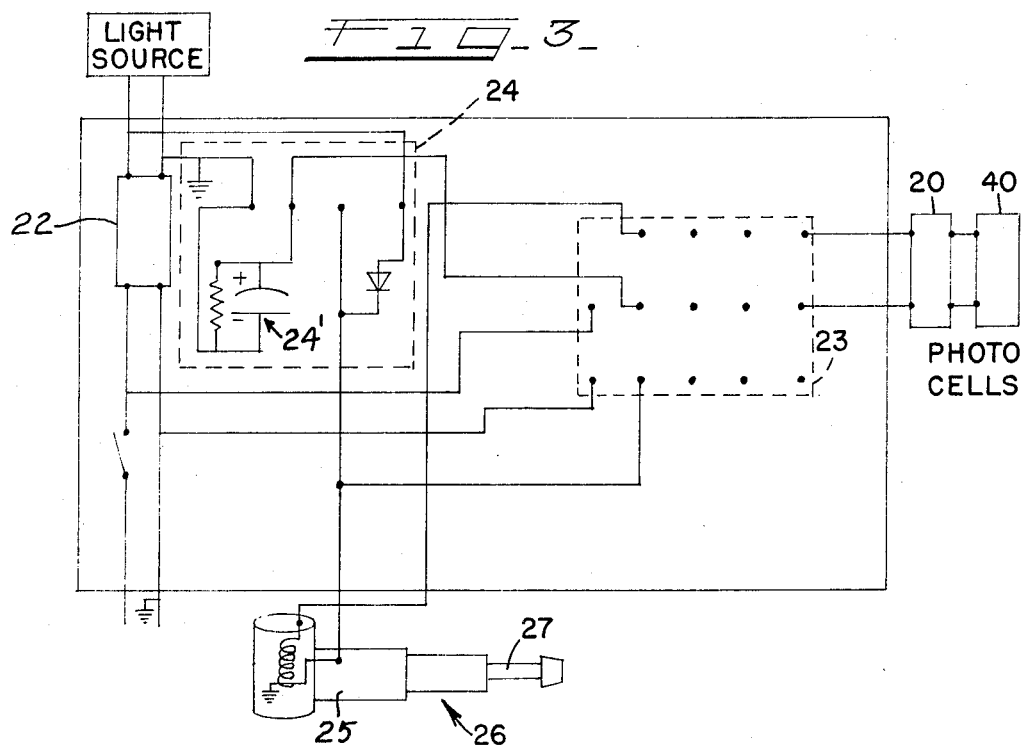
FIG. 3 is a schematic view illustrating the control circuit employed for operating the ejector device.

In the form of the apparatus illustrated, the product filled and capped bottles 10 are advanced on a continuously traveling conveyor belt 11 which forms part of the processing line and which may be driven in any suitable manner. The containers are advanced on the conveyor 11 in the direction of the arrows in FIG. 2 to an inspection station 12 where a light source 13 is mounted on an upright frame member 14 so as to direct a light beam, indicated at 15, across the conveyor 11 at a height, or elevation, where the beam will pass through the neck portion 16 of a bottle 10 as the bottle is advanced to the station 12. The beam 15 is disposed to pass above the level of the product, in a properly filled bottle, which is indicated at 17, the space between this level and the cap 18 being normally empty and generally referred to as "headspace" in the filled container, when the latter is properly filled, capped and processed. A photoelectric cell 20, or other light sensing device, is arranged on an upright support 21 at the opposite side of the conveyor 11 and aligned transversely with the light source 13 so as to be actuated by the beam 15 when it travels its normal path across the conveyor without any interference. The light sensing device or photocell 20 is connected into a suitable circuit, such as illustrated in FIG. 3, which may supply power to the light source 13 as indicated, through a transformer 22. The photocell is connected through a suitable amplifier 23 and a "Pulsa Pak" 24 with an electromagnetically operated air motor indicated at 25 in FIG. 3 which operates an ejector device 26 having a ram 27 operative across the conveyor 11 for ejecting or removing from the conveyor 11 a package 10 positioned at the inspection station 12. In the operation of the apparatus the passage of a properly filled package through the inspection station 12 does not interrupt the light beam 15 and the photocell 20 holds the circuitry in a condition so that the package 10 is allowed to proceed beyond the station 12 without interrupwhich has been overfilled so that the normal headspace in the neck 16 is filled with the product, the light beam 15 will be interrupted and the photocell 20 will operate to actuate the plunger 27 through the connecting circuit and eject the bottle 10 to a segregating area, the rejected bottles being indicated by the numeral 10' in FIGS. 1 and 2.

A second light sensing device or photocell 40 is mounted on the support 21 and disposed so as to be activated by the light beam 15 when the latter is deflected by passage through water or a mixture of water and product occupying the headspace in the neck 16 of the bottle, the deflected path of the beam 15 being indicated at 41. When the photocell 40 is activated by the refracted light beam the control circuit operates to eject the defective package in the same manner as described with respect to the photocell 20 when the beam 15 is blocked or interrupted.

The photocells 20 an 40 (FIG. 3) are connected in series and each photocell unit has a built-in amplifier and relay. Commercial units of this character are available which are adjustable so that the associated relay is triggered either when the photocell is illuminated or when it is dark. Also, the units may contain a time delay circuit which will receive an interruption of the light beam for a predetermined sustained period in order to operate the relay. A commercial photoelectric control unit which is suitable for use in the present system is produced by Electronics Corporation of America, Cambridge, Mass., and designated Type 22 DJ4. A pulse from the photocell resulting from blocking of the light beam or change in its character triggers the associated relay to close a switch and energize the transformer 22. The "Pulsa Pak" 24, which may be a commercial unit, is constantly energized through common and normally closed contacts of the photocell relays in the photocell units and a charge build-up in the condenser resistor unit 24'. When a package arrives at the station 12 which has water or lightly clouded water due to a mixture of water and product in the water-neck space, the light beam is refracted, as indicated at 41, and the photocell 40 is actuated which causes the associated relay to switch and reverse contacts so that when the normally open contact closes the "Pulsa Pak" 24, which operates as a one-pulse current storing circuit, actuates the electromagnetically operated air motor 25 to project the plunger 27 and eject the package. A suitable "Pulsa Pak" unit 24 for operating the air motor 25, which is available commercially, is produced by The Bellows Company, Division of Basic Economy Corp., Akron, Ohio, and is identified by Model No. PK 10.

In the operation of the system three conditions of the headspace are in effect sensed and the container is allowed to continue on the conveyor 11 or it is ejected to remove it from the same in accordance with the headspace condition. When an acceptable package reaches the inspection station 12, with no water and no product in the headspace, neither photocell 20 or 40 senses or "sees" the package and it passes through the station. When the headspace contains cloudy or nearly opaque water photocell 20 does not "see" the package because the beam of light is interrupted and a normally open contact in the relay in the photocell unit is closed which actuates the air motor 25 through the "Pulsa Pak" 24 to eject the package. When clear or partly cloudy water occupies the headspace photocell 20 "sees" the package due to the refraction and intensification of the light beam. The photocell 20 actuates its associated relay to close a contact and allows the "Pulsa Pak" 24 to operate the air motor 25 and eject the package from the conveyor 11. Photocell 40 does not "see" the package since some light will pass through the clearer water and the light beam is not interrupted to a sufficient degree to actuate the photocell.

I claim:

1. Apparatus for inspecting the headspace in product filled containers which are formed of glass or like material and for ejecting containers in which the headspace normally provided between the top level of the product and the bottom face of the closure is occupied by a substance which will cause refraction of a light beam or interfere with the passage thereof, said apparatus comprising conveyor means for advancing the containers to an inspection station, means at said inspection station for directing a beam of light across the path of advance of the containers so that it will pass through the headspace area of a container positioned at said inspection station, a photocell disposed on the opposite side of the container path which is actuated by the light beam when there is no interference with the passage of said beam, a second photocell also disposed on the opposite side of the container path which is actuated when there is a substance in said headspace which refracts the light beam, an ejector device for removing a container from said conveyor means, and means controlled by said photocells for operating said ejector device when a container is advanced to the inspection station which is not provided with an empty headspace, said means for operating said ejector device being actuated by the first mentioned photocell when the passage of the light beam is interrupted and being actuated by the second mentioned photocell when the light beam is refracted by a substance in the headspace area.

2. Apparatus for inspecting the headspace in product filled containers which are formed of glass or like material and for ejecting containers in which the headspace normally provided between the top level of the product and the bottom face of the closure is occupied by a substance which will cause refraction of a light beam, said apparatus comprising conveyor means for advancing the containers to an inspection station, means at said inspection station for directing a beam of light across the path of advance of the containers so that it will pass through the headspace area of a container positioned at said inspection station, a photocell disposed on the opposite side of the container path which is in the normal path of the light beam so that it is actuated by the light beam when there is no interference with the passage of said beam, a second photocell also disposed on the opposite side of the container path which is spaced relative to said first mentioned photocell in the direction of advance of the containers so that it is actuated when there is a substance in said headspace which refracts the light beam, an ejector device for removing a container from said conveyor means, and means controlled by said photocells for operating said ejector device when a container is advanced to the inspection station which has a substance in said headspace which interferes with the passage of the light beam.

3. Apparatus for inspecting the headspace in product filled containers which are formed of glass or like material and for signalling that the headspace normally provided between the top level of the product and the bottom face of the closure is occupied by a substance which will interfere with the passage of the light beam, said apparatus comprising means for advancing the containers to an inspection station, means at said inspection station for directing a beam of light so that it will pass through the headspace area of a container positioned at said inspection station a pair of light sensing devices disposed in horizontally spaced relation on the opposite side of the container path, one of said light sensing devices being in the path of said light beam so that it is actuated when the path of the light beam is blocked and the other one of said pair of light sensing devices being actuated when there is a substance in said headspace which refracts the light beam.

4. Apparatus as set forth in claim 3, and an ejector device for removing a container from said inspection station, which ejector device is actuated in response to a signal from said light sensing devices when a container is advanced to the inspection station which has a substance occupying said headspace which interferes with passage of the light beam.

5. Apparatus for sensing the presence of undesirable material in filled containers which are formed of glass or the like and which are advanced to an inspection station and for segregating containers in which the normally empty headspace provided between the top level of the product and the bottom face of the closure is occupied at least in part by said undesirable material, said apparatus comprising means at said inspection station for directing a beam of light so that it will pass through the headspace area of a container positioned at said inspection station, a light sensing device disposed on the opposite side of the container path which is in the normal path of the light beam when it passes through an empty headspace area, a second light sensing device also disposed on the side of the container path which is disposed so that it is in the path of said light beam when it is refracted as a result of the presence of the undesirable material in the headspace and means operative in response to actuation of said light sensing devices to segregate containers which are advanced to the inspection station with undesirable material in the headspace.

6. Apparatus as recited in claim 5, and said light sensing devices each comprising a photocell unit which is actuated in accordance with changes in the intensity of the light beam, electric circuitry controlled by said photocell units and said segregating means being operated by said electric circuitry in accordance with the operation of said photocell units.

7. Apparatus as recited in claim 1, and said ejector device comprising a reciprocably mounted member positioned for engaging a container at said inspection station and said means for operating said ejector device comprising an electrically powered operator for reciprocating said container engaging member.

References Cited
UNITED STATES PATENTS

| 3,094,213 | 6/1963 | Wyman | 209—111.7 |
| 3,232,429 | 2/1966 | Norwich | 209—111.7 |

RICHARD A. SCHACHER, Primary Examiner

U.S. Cl. X.R.

250—223; 356—240

UNITED STATES PATENT OFFICE
CERTIFICATE OF CORRECTION

Patent No. 3,509,996　　　　　　　　　Dated May 5, 1970

Inventor(s) Donald J. Malik

It is certified that error appears in the above-identified patent and that said Letters Patent are hereby corrected as shown below:

Column 1, line 39, after "packaging" insert -- line --.

Column 3, line 32, after "interrup-" insert -- tion. When a package 10 reaches the inspection station 12 --.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents